April 26, 1966  R. D. STROUT ETAL  3,247,530
SEAT CONSTRUCTION PARTICULARLY FOR
TRACTORS AND LIKE VEHICLES
Filed May 31, 1963  2 Sheets-Sheet 1
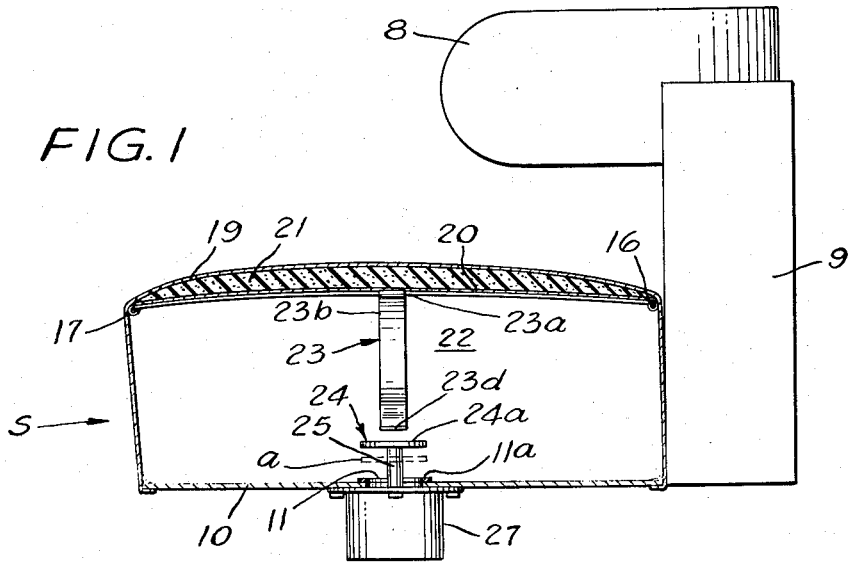
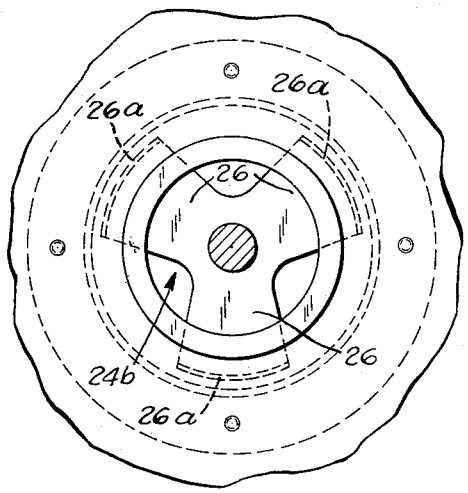
FIG. 4
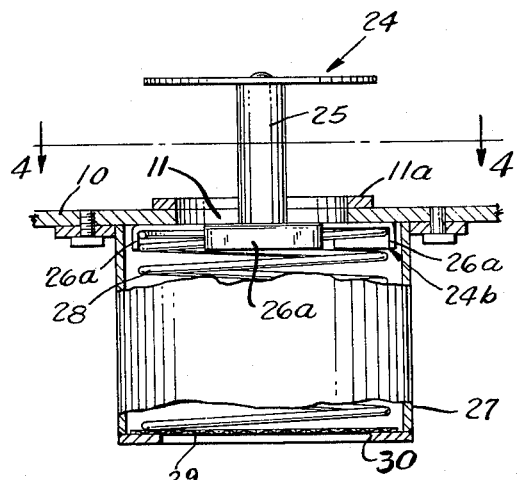
FIG. 5
INVENTORS.
RAYMOND D. STROUT
ANDREW J. FISHER, JR.
PETER WASMILLER, JR.

April 26, 1966 R. D. STROUT ETAL 3,247,530
SEAT CONSTRUCTION PARTICULARLY FOR
TRACTORS AND LIKE VEHICLES
Filed May 31, 1963 2 Sheets-Sheet 2

INVENTORS.
RAYMOND D. STROUT
ANDREW J. FISHER, JR.
PETER WASMILLER, JR.

United States Patent Office 3,247,530
Patented Apr. 26, 1966

3,247,530
SEAT CONSTRUCTION PARTICULARLY FOR TRACTORS AND LIKE VEHICLES
Raymond D. Strout, Andrew Jay Fisher, Jr., and Peter Wasmiller, Jr., Saginaw, Mich., assignors to Saginaw Wire Products, Inc., Saginaw, Mich., a corporation of Michigan
Filed May 31, 1963, Ser. No. 284,512
12 Claims. (Cl. 5—348)

This invention relates to seat constructions and more particularly to seat structures for vehicles such as agricultural tractors and the like in which the problems facing the seat designer are quite different from those encountered by the designer of seat structures for furniture, for instance. It is well known that tractors have large tires with traction providing tire lugs of considerable size which create low amplitude, high frequency ride vibrations. Further, of course, tractors are continually moving over furrows which may be three inches in depth, usually, but sometimes are as much as twelve inches in depth and must move out of the ends of the furrows onto the headland in repeated passes in the plowing of a field. Clearly, where the furrows are deep the obstacles are what might be termed large, and a considerable shock of high amplitude is transmitted to the tractor seat. Further, it is purposed by tractor manufacturers that tractors in the immediate future plow twice as fast as previously, and they are designing their equipment accordingly.

The object of the present invention, broadly stated, is to design a tractor seat which is comfortable and will absorb both normal ride vibrations and severe road shocks so that it does not unduly fatigue a driver who will be in the seat on virtually an all day basis. Various seat constructions have been proposed in which springs and air have been used conjunctively to cushion vibrations and shocks. However, to my knowledge no designer has attempted to solve, or has successfully solved, the problem of damping the rebound effect when severe shocks are encountered, while at the same time providing a seat which is eminently suitable for all the conditions that a tractor driven at an increased pace will encounter.

Accordingly, one of the prime objects of the invention is to provide an improved seat construction of novel and compact nature which includes springs for supporting the driver or seat occupant when low amplitude, high frequency vibrations are being encountered, which utilizes an air cushion in series with the springs to prevent bottoming of the load support surface when high amplitude vibrations or shocks are imparted to the seat, and which also restricts the rebound effect so that the driver will not be catapulted into the air and roughly jounced as an aftermath of a severe deflection of the seat construction.

A further object of the invention is to provide in a rigidly mounted seat the comfort attained with a full suspension seat, at something like half the cost thereof.

A further object of the invention is to provide a seat construction which will not bottom even when heavy drivers weighing in the neighborhood of 260 pounds are driving the tractor and severe road shocks are encountered.

Still a further object of the invention is to provide a reliable and durable seat construction which can be economically manufactured and assembled on a tractor.

Briefly, the invention is concerned with the provision of means within the seat cushion for closing an orifice in the bottom of the seat construction under severe deflections of the springs, which automatically operates at a predetermined time during the rebound of the seat structure to throttle the air inake through the opening and, accordingly, restrains the springs during their rebound movement and thereby prevents catapulting of the seat occupant due to the energy stored in the springs during deflection. The present invention provides, in essence, double acting valve means which throttles the replacement air needed to fill the enlarging cavity within the seat as the load bearing surface, less rapidly than otherwise, rises or recovers.

Other objects and advantages of the invention will be pointed out specifically or will become apparent from the following description when it is considered in conjunction with the appended claims and the accompanying drawings, in which:

FIGURE 1 is a sectional, side elevational view of the seat construction with the springs omitted in the interests of clarity;

FIGURE 4 is an enlarged top plan view taken on the line 4—4 of FIGURE 5; and

FIGURE 5 is an enlarged, fragmentary, side elevational view illustrating the valve construction which cushions severe ride shocks and dampens the rebound effects thereof.

Figure 3:
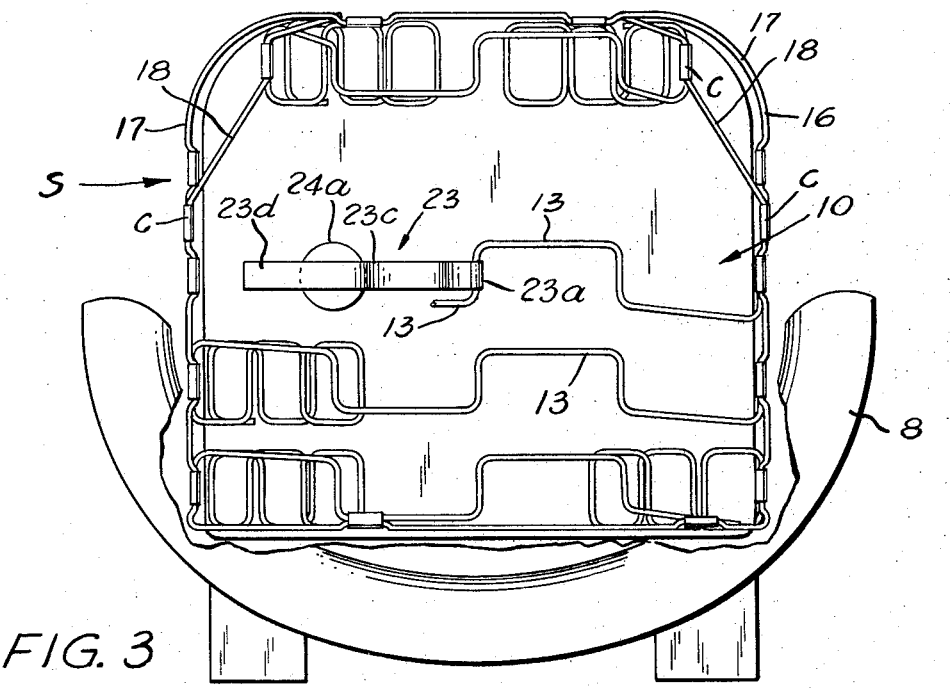
FIGURE 3 is a top plan view of the seat with the top wall stripped away so that the interior of the seat construction may be seen.
Figure 2:
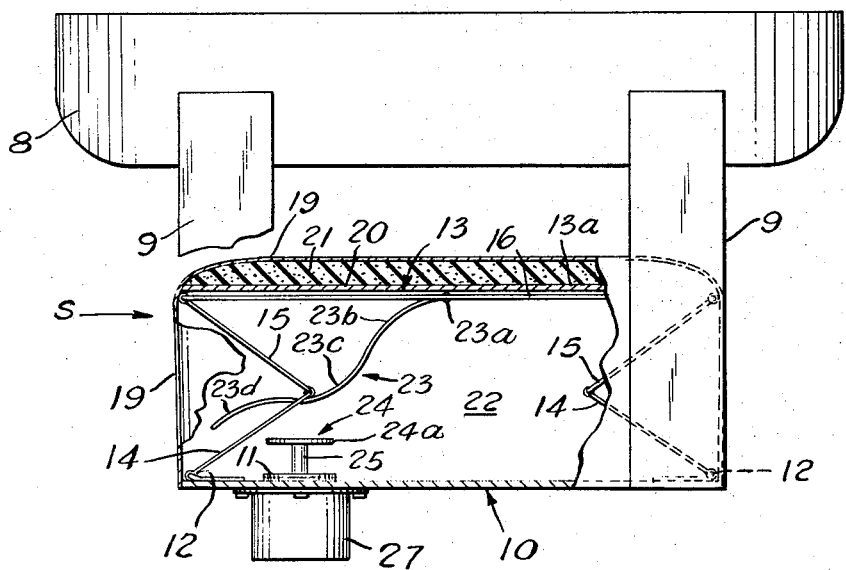
FIGURE 2 is a rear elevational view thereof with portions broken away to expose the interior of the seat.

Referring now more particularly to the accompanying drawings, wherein a preferred embodiment of the invention only has been shown, a letter S generally designates the seat construction which is shown in FIGURES 1 and 3 particularly as including a curvilinear back rest 8 rigidly attached to the preferably wood bottom 10 of the seat S by vertical rails 9. It will be seen that an opening 11 is provided in the bottom 10 and a seating ring 11a is mounted over the opening 11. Bottom clips 12 secure sinuous springs strips 13 in position on the rigid bottom 10, the spring strips 13 comprising sinuously formed fish mouth legs 14 and 15 supporting load support deck sections 16. At their upper ends the spring strips 13, which it will be noted extend transversely of the front and rear ends of the seat construction 10, are joined by front and rear border wire members 17 and 18 which are connected by wire clips C, as shown in FIGURE 3. Other clips C connect the springs 13 to the border wires 17 and 18.

The cushion S is constructed of a substantially air impervious material, such as the well-known Naugahyde plastic or any suitable canvas, and comprises fabric side walls 19 which are drawn under the wood bottom 10 and can be stapled thereto. The top of seat cushion S can be covered with a burlap pad insulator 20 on which is supported a soft plastic foam product 21, such as polyurethane foam, and the Naugahyde cover 19 is stretched over the top, as shown. With this construction a closed air chamber or cavity 22 is provided which is closed except for the restricted size opening 11.

Normally, the spring strips 13 maintain the side and top walls of the seat S in expanded condition, as shown in FIGURES 1 and 3. When an occupant is sitting in the seat, the springs 13 are, of course, deflected and the fabric side wall 19 is, of course, contractable so that the seat occupant is received by the seat. With the spring strips 13 extending transversely of the seat, a bucket effect is provided, which may be enhanced by fox-edging certain of the load bearing deck sections of the spring strips 13.

Attached to one of the spring strips 13 at substantially the mid-portion thereof is a strap member 23 which may be secured by having its one end 23a bent around the wire, as shown, and it will be seen that the strap 23 has a dependent section 23b formed with a concave portion 23c and a convex portion 23d. Mounted directly under the concave portion 23c is a spool valve member 24 having an upper or inner seating disk member 24a which, it will be observed, is of greater diameter than the opening 11 and when moved downwardly in a manner to be described covers and seals off the opening 11. Provided on the outer or lower end of the valve 24, which has a stem 25, is a lower disk member 24b which is comprised of circumferentially spaced apart wings 26 formed with downwardly turned flange portions 26a. A cylindrical housing 27 is fixed to and depends from the under side of the bottom 10 of the seat and mounts a return spring member 28 whose inner end, it will be noted, seats within the flange portions 26a of the seating disk wings 26. Normally, the spring 28 acts to urge the valve 24 upwardly to the solid line position in which it is shown in FIGURE 1. The opening 11 may be 1⅜ inches in diameter when the size of chamber 22 is 14 x 14 x 4 inches and the valve stem 25 is ¼ inch in diameter. The number 29 is a screen for bore 30.

In operation, the seat is completely automatic and functions to respond to the particular ride load imparted to it in a manner which cushions the ride and prevents a rebound effect. During comparatively slow and easy up and down movement of the load bearing surface constituted by the deck sections 16 of the springs 13 in the normal deflection range, the portion 23 is moved downwardly sufficiently to contact and displace the upper end of the valve 24 to approximately the position a shown in FIGURE 1. In the normal deflection range, then, the springs 23 principally support the weight of the rider and air flows freely through the opening 11. In this position of the valve 24, the air in the chamber 22 has really no effect on the load supported by the springs 13. Under heavy shock loads the spring strap 23 will force the valve 24 down sharply to a position in which the top disk 24a completely covers the opening 11. In this position of the valve 24 the air is prevented from escaping from the chamber 22 and resists compression, so that it prevents the bottoming of the load surface. In this instance, the springs 13 and the air cushion formed within the chamber 22 function conjunctively to resist the heavy shock load. A sharp rebounding action, which would tend to catapult the driver from the seat is, however, avoided because when the valve 24 moves rapidly upwardly once again, the disk 24b comes into engagement with the under side of the opening 11. Instead of there being a free flow of air through the opening 11, the air must proceed through the orifices 26a formed between the wings 26 into the chamber 22, and cannot flow as rapidly as it could if the opening 11 were open, for instance. This throttling of the replacement air prevents the springs 13 from returning as rapidly as they otherwise would do and dampens the rebound effect. Thus, both sudden downward movements and sudden upward movements are damped by the action of the valve member 24 whose spring 28 restores it to the position in which it is shown in FIGURE 1 as soon as it is permitted to do so. In fact, for sharp downward movements the high velocity flow of air out of the seat tends to close the valve 24 before the spring strips 23 normally would close it, and conversely on a sharp rebound the high velocity inflow of air will snap the valve to the throttling position even though spring strip 23 is trying to hold it partly open. Thus it will be seen that the seat operates automatically to the load imposed upon it.

While we have particularly mentioned the seat as ideally suited to use in tractors, it is to be understood that the seat is also well suited to use in other transport equipment such as boats, truck and various industrial vehicles, for instance.

It is also to be understood that the drawings and descriptive matter are in all cases to be interpreted as merely illustrative of the principles of the invention, rather than as limiting the same in any way, since it is contemplated that varous changes may be made in the various elements to achieve like results without departing from the spirit of the invention or the scope of the appended claims.

I claim:

1. In a seat construction: a seat structure including a bottom portion with an opening therein; means forming contractable air holding side and top walls to define with said bottom portion an air chamber within said seat construction; resilient spring means normally supporting said walls in an expanded condition; and valve means including a first surface for substantially fully covering said opening when said spring means is severely depressed, and a second surface throttling said opening when the spring means is returning to restrict the rebound effect thereof.

2. In a seat construction: a hollow substantially air impervious seat with an opening therein; spring means normally maintaining said seat in a condition of inflation; valve means operative to substantially close off said opening and prevent bottoming of said springs after a predetermined severe deflation of said seat, also throttling said opening to restrict the rebound effect; and means carried on said spring means having a path of travel to engage said valve means to force said valve means in a direction to substantially close said opening.

3. In a seat construction: a seat structure including a generally rigid bottom portion with an opening therein; means forming air holding, fabric, side and top walls to define with said bottom portion an air chamber within said seat construction; resilient spring strips with fish mouth ends attached to said bottom portion normally supporting said walls in an expanded position; and valve means providing a first surface for substantially fully covering said opening only when said spring means is severely depressed and said walls are deformed to collapse said air chamber, and a second surface throttling said opening when the spring means is returning said fabric walls to said expanded position to restrict the rebound effect thereof.

4. In a seat construction: a hollow, substantially air impervious seat having a rigid bottom portion with an opening therein and fabric side and top walls; spring strips mounted on said bottom portion in normal position maintaining said walls in expanded condition; a valve mounted in said opening and having spaced apart inner and outer seating surfaces on a stem; the outer surface having openings therein to permit a restricted passage of air through said opening; valve actuating means pressing said valve outwardly so that said inner seat surface covers the opening after a predetermined deflection of said spring strips; and spring means urging said valve inwardly and seating said outer seat surface over said opening when said spring strips have returned a predetermined distance toward said normal position.

5. In a seat construction: a hollow, substantially air imprevious seat having a substantially rigid bottom with a restricted opening therein and fabric side and top walls; a back member attached to said seat; spring strip means, with fish mouth legs mounted on said bottom, in normal position maintaining said walls in expanded condition; a valve mounted in said opening and having spaced apart inner and outer seating disks on a stem; the outer surface having circumferentially spaced openings therein to admit only a restricted passage of air through said opening; valve actuating means dependent from said strip means pressing said valve outwardly so that said inner disk covers the opening after a predetermined deflection of said spring strip means; and spring means urging said valve inwardly and seating said outer disk over said opening when said spring strip means have returned a predetermined distance toward said normal position.

6. In a seat construction: a seat structure including a bottom portion with an opening therein; means forming air holding side and top walls to define with said bottom portion an air chamber within said seat construction;

resilient means normally supporting said walls yieldable to permit said walls to partially collapse; and valve means including a first surface for controlling passage of air out said opening when said wall supporting means is partially collapsed, and a second surface of reduced opening covering area relative to said first surface throttling said opening when the spring means is returning to restrict the rebound effect thereof.

7. In a seat construction: a hollow, and at least partially collapsible, resilient seat means with an opening therein; and air flow control means providing a first surface, operative to substantially close off said opening and prevent bottoming after a severe collapsing of said seat means, and a second surface of reduced opening restricting area relative to said first surface throttling said opening when the seat means is returning from said collapsing thereof to restrict the flow of replacement air and damp the rebound effect.

8. In a seat construction: a hollow, and at least partially collapsible, resilient seat means providing an air chamber with an opening therein; and air flow control means movable to a first position operative to substantially close off air flow through said opening and prevent bottoming after a severe collapsing of said seat, a second position throttling air flow through said opening to restrict the rebound effect, and a position intermediate said first and second positions permitting substantially unrestricted air flow through said opening.

9. In a seat construction: a hollow, and at least partially collapsible seat with an opening therein; spring means maintaining said seat in a condition of inflation when it is unloaded; air flow control means operative to substantially close off said opening and prevent bottoming after a severe collapsing of said seat and to throttle said opening and restrict the air flow therethrough when the spring means is returning the seat to said condition of inflation to restrict the rebound effect; and means maintaining said air flow control means in a position in which it restricts the air flow through said opening when the seat is unloaded and in said condition of inflation.

10. The combination defined in claim 9 in which means is carried by said spring means in a position to engage said air flow control means and move it to a position in which said opening is substantially unrestricted upon less severe collapsing of said seat.

11. In a seat construction: a hollow, at least partially collapsible, resilient seat means providing an air chamber with an opening means therein; and air flow control means in one position engaging said opening means to substantially close off said opening means and prevent bottoming after a severe collapsing of said seat means and in a second position engaging said opening means to throttle said opening means and restrict air flow therethrough when said seat means is returning from said collapsing thereof to restrict the rebound effect.

12. In a seat construction: a hollow, at least partially collapsible, resilient seat means providing an air chamber with an opening means therein to atmosphere; and air flow control means, movable between "in" and "out" positions, in one of said positions operative to substantially close off said opening means and prevent bottoming after a severe deflection of said seat means and in the other position throttling said opening means to restrict the replacement air flow therethrough and damp the rebound effect when the resilient seat means is returning from said deflection.

References Cited by the Examiner
UNITED STATES PATENTS 2,593,831   4/1952   Bank _____ 5—247

FOREIGN PATENTS 139,181   9/1920   Great Britain.

FRANK B. SHERRY, *Primary Examiner.*

A. M. CALVERT, *Assistant Examiner.*